Patented Oct. 21, 1947

2,429,432

UNITED STATES PATENT OFFICE 2,429,432

GLASS COMPOSITION

John Edwin Stanworth, Sheffield, England, assignor to General Electric Company, a corporation of New York No Drawing. Application March 11, 1946, Serial No. 653,715. In Great Britain March 19, 1945

5 Claims. (Cl. 106—54)

The present invention relates to glass compositions possessing properties which render them suitable for use in the manufacture of electric lamps, valves and other devices. Such glasses must work satisfactorily in flames, usually on automatic machines, and should usually be adaptable to the mass production of tubing (and possibly bulbs) by automatic machinery. They must therefore not devitrify in those temperature regions of importance to the working and drawing or blowing operations. In the manufacture of lamps and valves, it is furthermore generally necessary for the glasses to seal to a suitable wire (for example, copper clad nickel-iron) adapted to serve as the lead-in conductor to the filament or electrodes, and it is often a great advantage if the glass has a high specific electrical resistivity.

All these requirements have hitherto been met by the use of lead oxide as a major constituent of the glass. There are, however, some disadvantages associated with lead; for example, lead glasses are easily reduced in a flame, and if melted in a continuous tank furnace there may be trouble associated with the volatilization of lead oxide.

The object of the present invention is to provide glasses containing no lead but which have all the above desirable properties.

Glass compositions according to the present invention have constituents falling within the following ranges in per cent by weight:

Silica+boric oxide _____ 56–64
Oxides of barium, strontium, magnesium, zinc, calcium _____ 22–30
Oxides of sodium and potassium _____ 10–17
Fluorine _____ 0–5

The use of boric oxide is desirable in that glasses containing it are soft in flame working; this oxide, however, is expensive and so its introduction may be limited in general to 8% on grounds of cost. Of the oxides of divalent elements, calcium oxide is particularly valuable because of the high specific resistivity which it confers. Glasses containing too much of this oxide, however, may devitrify too easily, so in general not more than 5% lime should be used. Barium and strontium oxides are particularly valuable in that high percentages may be successfully introduced and both confer very good electrical properties and ease in flame working; up to 20% barium oxide plus strontium oxide may be introduced. For example, about 14–20% of SrO and/or BaO may be used. As regards divitrification properties, however, better glasses can be made if zinc oxide and magnesium oxide are introduced in addition to barium oxide and/or strontium oxide. Zinc oxide and magnesium oxide do not favor such high specific resistivities so the contents may be limited to 10%. For example, 0–10% of MgO, and 5–10% of ZnO may be used. The introduction of fluorine is very advantageous in making soft easy worked glasses but too much will produce opalescence in working. In general 2% of fluorine will be sufficient.

A particular application of these glasses is in the manufacture of tubing for forming the stem into which the leads of lamps and valves are sealed, the stem then being joined to an envelope of soda-lime glass. This application further limits the range of compositions which may be used in practice, and preferred glass compositions in per cent by weight are as follows:

Silica+boric oxide _____ 58–62
Oxides of barium, strontium, magnesium, zinc and calcium _____ 24–28
Oxides of sodium and potassium _____ 12–15
Fluorine _____ 0–2
Boric oxide _____ per cent maximum __ 10
Barium+strontium oxides _____ do____ 20
Magnesium oxide _____ do____ 10
Zinc oxide _____ do____ 10
Calcium oxide _____ do____ 5

Preferred compositions falling within that limited range which we have found particularly suitable are as follows:

| $SiO_2$ | $B_2O_3$ | SrO | BaO | MgO | ZnO | CaO | $K_2O$ | $Na_2O$ | $F_2$ |
|---|---|---|---|---|---|---|---|---|---|
| 52.9 | 6.2 | ---- | 14.4 | ---- | 8.4 | 1.9 | 10.2 | 4.4 | 1.3 |
| 56.0 | 4.0 | 11.6 | 4.0 | 5.0 | 5.0 | ---- | 6.0 | 7.0 | 1.3 |

Thus, according to the preferred compositions, the $SiO_2$ content is over 50%, with $SiO_2+B_2O_3$ being about 60%; the content of the alkaline earth oxides SrO, BaO and CaO is about 16%, with a combined content of about 14–16% of SrO and/or BaO; the content of ZnO or ZnO+MgO is about 8–10%; and the alkali oxide content is about 13–15%.

What I claim as new and desire to secure by Letters Patent of the United States is:

1. A non-lead glass composition comprising approximately 56–64% of silica plus boric oxide 22–30% of the oxides of barium, strontium, magnesium, zinc, and calcium, 10–17% of alkali oxides, and 0–5% of fluorine.

2. A non-lead glass composition comprising approximately 56–64% of silica plus boric oxide with the boric oxide content not more than about 10%, about 14–20% of one or both oxides of the group consisting of strontium and barium oxides, 0–5% of calcium oxide, 0–10% of magnesium oxide, 5–10% of zinc oxide, the combined content of the oxides of barium, strontium, magnesium, zinc and calcium being about 22–30%, 10–17% of alkali oxides, and 0–5% of fluorine.

3. A non-lead glass composition comprising approximately 60% of silica plus boric oxide, the silica content being at least about 50%, about 16% alkaline earth oxides of which about 14–16% is selected from the group consisting of barium oxide and strontium oxide and mixtures thereof, about 8–10% of oxide selected from the group consisting of zinc oxide and mixtures of zinc oxide and magnesium oxide, and about 13–15% of alkali oxides.

4. A non-lead glass having a composition approximately as follows:

| | Per cent |
|---|---|
| $SiO_2$ | 52.9 |
| $B_2O_3$ | 6.2 |
| $BaO$ | 14.4 |
| $ZnO$ | 8.4 |
| $CaO$ | 1.9 |
| $F_2$ | 1.3 |
| Alkali oxides | 14.6 |

5. A non-lead glass having a composition approximately as follows:

| | Per cent |
|---|---|
| $SiO_2$ | 56.0 |
| $B_2O_3$ | 4.0 |
| $SrO$ | 11.6 |
| $BaO$ | 4.0 |
| $MgO$ | 5.0 |
| $ZnO$ | 5.0 |
| $F_2$ | 1.3 |
| Alkali oxides | 13.0 |

JOHN EDWIN STANWORTH.